United States Patent [19]

Laguna et al.

[11] 3,882,730

[45] May 13, 1975

[54] METHOD OF DETERMINING THE CORRECTION COMPONENTS OF THE OUT-OF-BALANCE WEIGHT, MAKING ANY ANGLE BETWEEN THEM, ON A DYNAMIC BALANCING MACHINE

[75] Inventors: Louis Laguna; Christian Langlois, both of Castres, France

[73] Assignee: Regie Nationale des Usines Renault, Billancourt, France

[22] Filed: Sept. 7, 1973

[21] Appl. No.: 395,159

[30] Foreign Application Priority Data
Oct. 16, 1972  France .............................. 72.36608

[52] U.S. Cl. ................................................ 73/462
[51] Int. Cl. ............................................ G01m 1/14
[58] Field of Search ...................... 73/462, 463–465

[56] References Cited
UNITED STATES PATENTS
2,722,830   11/1955   Federn et al. ......................... 73/463
FOREIGN PATENTS OR APPLICATIONS
1,276,365   8/1968   Germany .............................. 73/462

40-15383   2/1965   Japan .................................... 73/462

Primary Examiner—James J. Gill
Attorney, Agent, or Firm—Stevens, Davis, Miller & Mosher

[57] ABSTRACT

A method of determining the correction components of the out-of-balance weight vector on a dynamic balancing machine with the components lying at an angle $\alpha$ between one another. The method comprises defining in each plane of correction two axes of measurement $OX_1$, $OY_1$ associated with each of two axes of correction OX and OY and such that the axis $OX_1$ is perpendicular to the axis OY and the axis $OY_1$ is perpendicular to the axis OX, a signal received from the machine in respect of each said axis of measurement $OX_1$, $OY_1$ defining a correcting factor $x$, $y$ associated with the respective axis of correction OX, OY and from the values plotted on the axes of measurement $OX_1$ and $OY_1$ associated with said axes of correction OX, OY straight lines $BC_1$, $BD_1$ are drawn which are parallel to the other axis of correction OY, OX and which intersects the associated axis of correction at a point defining the corresponding correction vector.

3 Claims, 2 Drawing Figures

METHOD OF DETERMINING THE CORRECTION COMPONENTS OF THE OUT-OF-BALANCE WEIGHT, MAKING ANY ANGLE BETWEEN THEM, ON A DYNAMIC BALANCING MACHINE

BACKGROUND OF THE INVENTION

1. Field of the Invention

This invention relates to a method of determining the correction components, of the out-of-balance weight vector, making an angle between them, on a dynamic balancing machine.

2. Description of the Prior Art

In the automobile industry a dynamic balancing machine having a movable frame is used for balancing crankshafts of internal-combustion engines.

On this machine the orthogonal projection of the out-of-balance weight vector both on to the plane of movement of the axis of the crankshaft and on a plane perpendicular to the said plane of movement, are measured in planes perpendicular to the axis of rotation of the crankshaft, generally in planes situated at the height of the bearings supporting the member.

This orthogonal projection is transposed into the planes of correction on two axes, known as axes of measurement, which pass through the axis of rotation of the crankshaft.

Starting from the values obtained in each plane of correction on these axes of measurement, the value of the vector components of the out-of-balance weight on two given axes of correction passing through the axes of rotation of the crankshaft, are found by calculation.

The method of obtaining the orthogonal projections on the two axes of measurement of the plane of correction does not concern the present invention, and consequently this method will not be described.

The automatic determination of the two vector components calls for a series of electronic calculations.

One object of the present invention is to eliminate this series of calculations by an appropriate choice of the axes of measurement of each plane of correction.

SUMMARY OF THE INVENTION

According to the present invention, there is provided a method of determining the correction components of an out-of-balance weight vector on a dynamic balancing machine, said components lying at an angle $\alpha$ between one another, said method comprising defining in each plane of correction two axes of measurement $OX_1$, $OY_1$ associated with each of two axes of correction $OX$ and $OY$ and such that the axis $OX_1$ is perpendicular to the axis $OX$, a signal received from the machine in respect of each said axis of measurement $OX_1$, $OY_1$ defining a correcting factor $x$, $y$ associated with the respective axis of correction $OX$, $OY$ and from the values plotted on the axes of measurement $OX_1$ and $OY_1$ associated with one said axis of correction $OX$, $OY$ straight lines $BC_1$, $BD$ are drawn which are each parallel to one of the axes of correction $OY$, $OX$ and which intersect the associated axis of correction at a point defining the corresponding correction vector.

BRIEF DESCRIPTION OF THE DRAWINGS

The invention will now be described, by way of example, with reference to the accompanying diagrammatic drawing, in which.

DESCRIPTION OF THE PREFERRED EMBODIMENT

Figure 1:
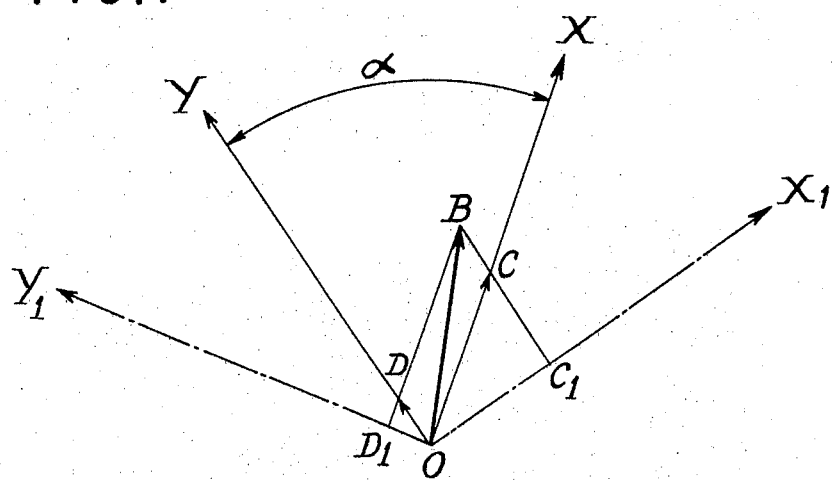
FIG. 1 is a diagram representing the resolution of an out-of-balance weight vector onto two components.

The diagram of FIG. 1 shows two oriented axes of correction $OX$ and $OY$ forming between them an angle $XOY = \alpha$, and an out-of-balance weight vector $OB$ of which the components projected on axes $OX$ and on $OY$ are respectively $$OC = x \text{ and } OD = y.$$

If from $O$ a straight line $OX_1$ is drawn which is perpendicular to $OY$ and a straight line $OY_1$ which is perpendicular to $OX$, a straight line $BC$ can be drawn which is parallel to $OY$ by construction and perpendicular to $OX_1$ which it intersects at $C_1$. Likewise it is possible to draw a straight line $BD$ which is parallel to $OX$ by construction and perpendicular to $OY_1$ which it intersects at $D_1$.

$OC_1 = x_1$ is the orthogonal projection of $OB$ on $OX_1$ and $OD_1 = y_1$ is the orthogonal projection of $OB$ on $OY_1$.

Consequently, (1) $\qquad x = x_1 \cdot \dfrac{1}{\sin \alpha}$ (2) $\qquad y = y_1 \cdot \dfrac{1}{\sin \alpha}$ The vector components of $OB$ on $OX$ and $OY$ are therefore equal respectively to the projections on $OX_1$ and on $OY_1$ multiplied by the constant coefficient $1/\sin \alpha$, and this eliminates any series of calculations to obtain the vector components $OX$ and $OY$ starting from the orthogonal projections $OC_1$ and $OD_1$ on the axes of measurement. The signals picked up from the balancing machine have a low voltage and always have to be amplified, and to allow for this constant coefficient it will be sufficient to provide slightly less amplification.

Figure 2:
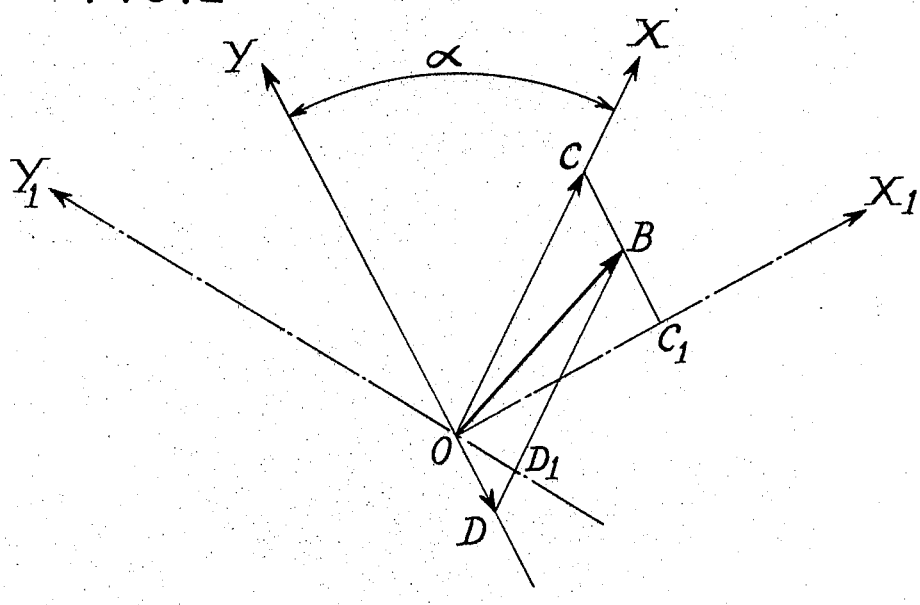
FIG. 2 is a diagram showing the resolution onto components of an out-of-balance weight vector situated externally of an angle $\alpha$.

FIG. 2 shows a special case in which the out-of-balance weight vector $OB$ is situated outside the angle $\alpha$, towards the axis $OX$. In this case the method applies in the same way as in the case shown in FIG. 1, the projection of the point $B$ on the axis of measurement $OY_1$ and on the axis of correction $OY$ being made on a prolongation of the axis of measurement $OY_1$ and of the axis of correction $OY$ beyond the point $O$.

The method according to the invention is applicable to any machine for balancing members of which the out-of-balance weight can be compensated only in accordance with precise instructions. It is advantageous for the crankshafts of internal combustion engines, particularly those which do not allow balancing to be effected all round their axes.

We claim:

1. A method of determining the correction components of an out-of-balance weight vector on a dynamic balancing machine, said components lying at an angle $\alpha$ between one another, said method comprising:

defining in each plane of correction two axes of measurement $OX_1$, $OY_1$ associated with each of two axes of correction $OX$ and $OY$ and such that the axis $OX_1$ is perpendicular to the axis $OY$ and the axis $OY_1$ is perpendicular to the axis $OX$;

making measurements of imbalance along each of said axes of measurement $OX_1$, $OY_1$, for defining correcting factors associated with the measurement axes $OX_1$, $OY_1$; and deriving from the value of the correction factors along the axes of measurement $OX_1$ and $OY_1$ a vector having components parallel to the axes of correction $OY$, $OX$ and which components lie along lines which are defined by the tip of said vector and the tips of said correction factors, said lines intersect the associated axes of correction at points defining the corresponding correction to be made along each of said correction axes $OX$, $OY$.

2. A method of determining the correction components of an out-of-balance weight vector on a dynamic balancing machine, said components lying at an angle $\alpha$ between one another, said method comprising:

defining in each plane of correction two axes of measurement $OX_1$, $OY_1$ associated with each of two axes of correction of $OX$ and $OY$ and such that the axis $OX_1$ is perpendicular to the axis $OY$ and the axis $OY_1$ is perpendicular to the axis $OX$;

deriving a signal from measurements made along each of said axes of measurement $OX_1$, $OY_1$, said signal defining correcting factors associated with the respective measurement axes $OX_1$, $OY_1$; and deriving vector components of correction along axes $OX$ and $OY$, by multiplying the projections on axes $OX_1$ and $OY_1$ multiplied by a coefficient $1/\sin \alpha$ where $\alpha$ is the angle between $OX$ and $OY$.

3. The method according to claim 1 wherein the correction to be made along each of the correction axes $OX$, $OY$ is obtained by means of:

plotting from the value of measurement on one of the axes of measurement a straight line parallel to the first correction axis perpendicular to the axis of measurement so that said line intersects the other second axis of correction and plotting from the value of measurement on the other one of the axes of measurement a straight line parallel to the second correction axis which is perpendicular to said other axis of measurement so that said line intersects with said first axis of correction, whereby the points of intersection of said lines with said axes of correction are indicative of the value of correction to be made along said axes of correction.

* * * * *